United States Patent [19]

Gamay

[11] Patent Number: 5,225,220

[45] Date of Patent: * Jul. 6, 1993

[54] PROCESS FOR PREPARING LOW FAT CHEESE PRODUCTS

[75] Inventor: Aly Gamay, Franklin, Wis.

[73] Assignee: Alpine Lace Brands, Inc., Maplewood, N.J.

[ * ] Notice: The portion of the term of this patent subsequent to Jan. 14, 2009 has been disclaimed.

[21] Appl. No.: 877,953

[22] Filed: Apr. 30, 1992

Related U.S. Application Data

[63] Continuation of Ser. No. 522,203, May 11, 1990, abandoned.

[51] Int. Cl.⁵ .................... A23C 19/032; A23C 19/06; A23C 19/09; A23C 19/14
[52] U.S. Cl. ........................................ 426/39; 426/40; 426/42; 426/522; 426/582
[58] Field of Search ...................... 426/34, 35, 36, 37, 426/38, 39, 40, 42, 43, 47, 522, 580, 581, 582, 583, 585, 586, 804

[56] References Cited

U.S. PATENT DOCUMENTS

| | | |
|---|---|---|
| 3,780,182 | 12/1973 | Johnson et al. . |
| 3,840,672 | 10/1974 | Kasik et al. . |
| 3,873,729 | 3/1975 | Kubota et al. . |
| 3,882,250 | 5/1975 | Loter et al. . |
| 3,922,376 | 11/1975 | Strinning et al. . |
| 3,929,892 | 12/1975 | Hynes et al. . |
| 3,953,610 | 4/1976 | Little . |
| 3,961,077 | 6/1976 | Kielsmeier . |
| 3,969,534 | 12/1976 | Pavey et al. . |
| 3,975,544 | 8/1976 | Kosikowski . |
| 4,000,332 | 12/1976 | Strinning et al. . |
| 4,020,185 | 4/1977 | Andersen et al. . |
| 4,066,800 | 1/1978 | Rosenau et al. . |
| 4,085,228 | 4/1978 | Reinbold et al. . |
| 4,133,895 | 1/1979 | Kosikowski et al. . |
| 4,169,160 | 9/1979 | Wingerd et al. . |
| 4,169,854 | 10/1979 | Igoe . |
| 4,177,293 | 12/1979 | Forman et al. . |
| 4,244,983 | 1/1981 | Baker . |
| 4,277,503 | 7/1981 | Bily . |
| 4,288,459 | 9/1981 | Baker . |
| 4,318,928 | 3/1982 | Sing . |
| 4,362,749 | 12/1982 | Sozzi . |
| 4,366,174 | 12/1982 | Kneubuehl et al. ................... 426/36 |
| 4,379,175 | 4/1983 | Baker . |
| 4,410,549 | 10/1983 | Baker . |
| 4,416,905 | 11/1983 | Lundstedt et al. . |
| 4,434,184 | 2/1984 | Kharrazi . |
| 4,459,313 | 7/1984 | Swanson et al. . |
| 4,476,143 | 10/1984 | Czulak et al. ........................ 426/40 |
| 4,534,982 | 8/1985 | Yoshida et al. . |

(List continued on next page.)

FOREIGN PATENT DOCUMENTS

| | | |
|---|---|---|
| 834092 | 2/1970 | Canada . |
| 1248407 | 1/1987 | Canada . |
| 187831 | 7/1985 | European Pat. Off. . |
| 1374094 | 9/1971 | United Kingdom . |
| 2106366A | 9/1982 | United Kingdom . |
| 2214776A | 6/1988 | United Kingdom . |

OTHER PUBLICATIONS

"Evaluation of Alternative Methods to Increase Calcium Retention in Cottage Cheese Curd," M. A. Craddock & C. V. Moor, *Journal of Food Science* (1988), vol. 53, No. 6, pp. 1680-1683.

"Effect of Enzyme Treatment and Ultrafiltration on the Quality of Lowfat Cheddar Cheese," J. U. McGregor & C. H. White, *Journal of Dairy Science* (1990), vol. 73, No. 3, pp. 571-578.

"Innovative Cottage Cheese Manufacturing Pro-
(List continued on next page.)

*Primary Examiner*—Arthur L. Corbin
*Attorney, Agent, or Firm*—Reinhart, Boerner, Van Deuren, Norris & Rieselbach

[57] ABSTRACT

A low fat cheese product is prepared by mixing liquid milk with carrageenan and a lactic acid producer to prepare a cheese formulation solution which is coagulated to form a curd in a whey solution. The pH of the curd is adjusted to and maintained at 4.7-5.5 and whey solution is separated therefrom. The curd is then ripened to form a low fat cheese product.

23 Claims, No Drawings

U.S. PATENT DOCUMENTS

| | | |
|---|---|---|
| 4,547,385 | 10/1985 | Lindstam . |
| 4,568,555 | 2/1986 | Spanier . |
| 4,581,240 | 4/1986 | Smith . |
| 4,631,196 | 12/1986 | Zeller . |
| 4,684,533 | 8/1987 | Kratochvil . |
| 4,713,254 | 12/1987 | Childs et al. . |
| 4,719,113 | 1/1988 | Kharrazi . |
| 4,719,118 | 1/1988 | Thomas . |
| 4,724,152 | 2/1988 | Baker et al. . |
| 4,732,769 | 3/1988 | Sozzi et al. . |
| 4,749,584 | 6/1988 | Wirchansky et al. ............... 426/582 |
| 4,806,479 | 2/1989 | Kegel et al. . |
| 4,837,035 | 6/1989 | Baker et al. . |
| 4,837,036 | 6/1989 | Baker et al. . |
| 4,851,243 | 7/1989 | Andersen et al. . |
| 4,906,481 | 3/1990 | Bussiere et al. . |
| 4,917,905 | 4/1990 | Guy et al. . |
| 4,919,944 | 4/1990 | Bussiere et al. . |

OTHER PUBLICATIONS cesses," Gerald W. Smith, *Cultured Dairy Products Journal* (Nov. 1983), pp. 22–23.

"An Attempt to Produce Low Fat Cephalotyre (Ras) Cheese of Acceptable Quality," A. A. El-Neshawy, A. A. Abdel Baky, A. M. Rabie & M. M. Ashour, *Food Chemistry* (1986), vol. 22, pp. 123–127.

PROCESS FOR PREPARING LOW FAT CHEESE PRODUCTS

This is a continuation of co-pending application Ser. No. 07/522,203 filed on May 11, 1990, now abandoned.

BACKGROUND OF THE INVENTION

The present invention is related generally to a method and article of manufacture of low fat, low cholesterol and low calorie process cheese products More particularly, the invention is concerned with a method of manufacturing various low fat, low cholesterol and low calorie real process cheeses, such as Process American, Process Mozzarella and Provolone. Such process cheeses exhibit the appropriate functionality in terms of melting, stretching, slicing and shredding, as well as having good taste associated with typical higher fat process cheeses.

The general public has become increasingly aware of the need to control the intake of fats and cholesterol in their diets. Dairy products, particularly cheese products are regarded as a significant source of saturated fats and cholesterol. Medical studies have concluded that human consumption of such fats and cholesterol should be limited in order to avoid such maladies as coronary heart disease. The general recommendation has thus been to greatly reduce and even eliminate consumption of cheese which is a concentrated source of such detrimental, unhealthy fats and cholesterol. This recommendation is rapidly becoming accepted by the public and is resulting in substantial decrease in the consumption of cheese food products. Substantial efforts have been mounted over about the past ten years to discover a method and article of manufacture of low fat, low cholesterol cheese generally having the flavor and texture of normal cheese. It has been determined that the presence of fat is important in obtaining the right body and texture of the finished cheese, and the fat also has an important role in the flavor of the cheese product. All of these features affect consumer acceptability of the product. As stated by the cheese expert Kosikowski in his textbook on cheesemaking, *Cheese and Fermented Milk Foods*, F. V. Kosikowski and Associates, Brooktondale, N.Y., 1978 2nd ed.:

In this diet and calorie conscious era, skim milk cheddar cheese would appear to be destined for greater popularity, but the fact is that the cheese has no appetizing characteristics. It is without much cheese flavor and body texture is usually as hard as rock. Rapid drying out of the cheese during cooking is a characteristic feature, despite the normal low cooking temperatures of 31° C. (Kosikowski, p. 242)

Imitation cheeses have been regarded as an inferior food because such cheeses do not use natural milk, instead using casein derived from milk proteins obtained by chemical processing. In addition, imitation cheese includes numerous chemicals and additives which make the labelled contents less appealing to the health-conscious consumer. Recently the United Dairy Association awarded the "Real" seal to dairy products containing natural milk ingredients. The consumer correlates the "Real" seal with high quality which has an important effect on the marketability of imitation cheeses.

Process cheeses typically contain an oil phase consisting of fats and oil soluble proteins and minerals. The two phases are not naturally compatible and thus in order to produce a quality product, the manufacturing process requires modification by surface active proteins. Surface active proteins are generally soluble in both the oil and water phases. One end region of the casein protein contains calcium phosphate groups and carries essentially all of the protein charge, while the other end is organic and non polar in nature. The phosphate end is water soluble while the organic end is fat soluble. It is generally believed this feature gives these proteins their emulsifying properties. The protein/fat ratio of process cheese is thus quite important in determining proper processing conditions to achieve the desired texture of the finished product. Emulsifying proteins are not very soluble in water, tending to clump and form grainy deposits. Therefore, fat free process cheeses are normally grainy and hard in texture. This can be compared to high fat process cheeses in which one end of the protein will dissolve in the fat while the other end will dissolve in the water, resulting in a homogeneous product. In low fat cheese there is not enough fat to accommodate all the proteins. The excess proteins will then separate into grainy or chalky water phase deposits. It is also very difficult to impart desirable cheese flavors in a conventional fat free process because of the absence of fats and because the fats are still the major source of flavor in fat containing cheeses.

Another difficulty in the prior art is the poor melting characteristics of conventional low fat cheeses. Typically, such low fat cheeses are prepared from curds having a pH in excess of 5.5. Such curd has poor melting properties, usually melts at higher temperatures and results in a heavy product which melts with difficulty and cannot be pumped very well. These problems are believed to derive at least in part from the presence of excessive calcium.

OBJECTS OF THE INVENTION

It is therefore an object of the invention to provide an improved method and article of manufacture of low fat process cheese.

It is another object of the invention to provide a novel product and method of manufacture of process cheese substantially free of fat and cholesterol and low in calories.

It is an additional object of the invention to provide an improved method of manufacture and product of low fat process cheese having the texture and flavor of typical fat containing process cheese.

It is yet another object of the invention to provide a novel method of manufacture and product of manufacture of low fat process cheese using carrageenan.

It is still an additional object of the invention to provide an improved low fat process cheese product manufactured using selected varieties of cheese flavorants and carrageenans with the starting material of low fat cheese.

It is a further object of the invention to provide a novel method of manufacture and product using one or more protein stabilizers to vary texture and flavor of process cheeses.

It is yet an additional object to prepare low fat, low calcium process cheese having superior melting properties.

Additional objects and advantages are set forth in the Detailed Description and Examples and in two copending applications "Low Fat, Low Cholesterol Cheese", Ser. No. 07/522,527, now U.S. Pat. No. 5,080,913, and "Flavor Enhanced Low Fat Cheese", Ser. No. 07/522,676, now abandoned, both of which are incorporated by reference herein in its their entirety.

DETAILED DESCRIPTION OF PREFERRED EMBODIMENTS

In accordance with one form of this invention, low fat cheese useful as a starting product for the process cheese inventions is described in the above described companion application on "Low Fat, Low Cholesterol Cheese" filed contemporaneously with this application. Such a method of manufacture for low fat cheddar cheese involves, for example, using a basic starting liquid milk standardized to a low fat content in the range of roughly 0–0.3% and most preferably about 0.01–0.1%, depending on the type of cheese being manufactured. Typically a commercially available skim milk was used although non-dairy solutions can also be used as the starting liquid milk.

In the most preferred embodiment carrageenan is a useful component for processing the milk to obtain the end product low fat, low cholesterol cheese. Carrageenan is a group of galactan polsaccharides extracted from red algae and has an ester content of about 20% or more. Carrageenan is generally a mixture of several polysaccharides, but primarily consists of three components, kappa, lambda, and iota. The amounts of each of these components or phases varies with the source.

In general, the kappa carrageenan phase contains over 34% of 3,6-anhydro-D-galactose (3,6-AG) and 25% ester sulfate by weight. A 1.5% by weight concentration in water at 75° C. exhibits a viscosity of roughly 50 mPa. Upon cooling a water solution of carrageenan will gel at a temperature of from about 45° to 65° C., with the gelling temperature and gel firmness depending upon the quantity and types of metallic ions, for example, $K^+$, $Ca^{++}$ and $NH_4^+$, which are present in the solution.

Typically, the lambda carrageenan phase contains approximately 35 wt. % ester sulfate but includes no 3,6-AG. The lambda phase forms a free-flowing solution in water, and lambda carrageenan is a non-gelling entity. The lambda carrageenan phase produces the highest water viscosities. Thus, for a 2.0 wt. % concentration of lambda carrageenan in water viscosities are in excess of 600 mPa.

The iota carrageenan phase contains approximately 30% 3,6-AG and 32 wt. % ester sulfate and upon cooling and in the presence of gel-inducing cations, such as $Ca^{++}$, $Mg^{++}$ and $K^+$, the iota carrageenan can form elastic, syneresis-free, thermally-reversible gels at concentrations as low as 0.3 wt. %

In the conventional manner, the carrageenan fractions described above shall be hereafter referred to as carrageenan, with the understanding that reference, for example, to one of the major carrageenan phases does not preclude the presence of at least some of the other two phases, as well as precursors of all the phases.

In an aspect of the invention, carrageenans are used to controllably react with milk casein. Without limitation and without requiring such actual functionality in the claims, it is believed that at certain locations on the surface of the casein micelle there are concentrations of positive charges which can react strongly with the negative charges of the carrageenan. Such a reaction can form a strong matrix responsible for suspending milk casein and decreasing shrinkage of the curd. Irregardless of the precise chemical functionality it has been found from experimentation that the carrageenan allows processing of the cheese curd to proceed in an advantageous manner and achieve a low fat cheese with taste and texture quite similar to typical fat containing cheeses.

The liquid milk used in preparing one form of low fat cheese starting material for process cheese manufacture is preferably pasteurized at a temperature between about 160°–180° F. and then cooled to about 85°–95° F. The liquid milk is mixed with a stabilizer material, such as, for example, carrageenan with the ratio of kappa to iota carrageenans adjusted. The carrageenan can also be mixed with dry skim milk and even dried whey and then dissolved in water or a volume of liquid milk to obtain the desired liquid milk mixture. In another form of the invention the carrageenan can be added to the milk before, rather than after, pasteurization and still achieve the desirable end product cheese. The amount of carrageenan is preferably less than about 0.1–0.2% by weight since further amounts have no additional beneficial effect. Most preferably the carrageenan is less than about 0.06% by weight.

After the carrageenan has been completely dissolved in the milk solution, a cheese formulation solution is prepared by adding the following preferred cheese cultures to the milk/carrageenan solution *Streptococcus lactis, Streptococcus cremoris, Streptococcus thermophilus, Lactobacillus helveticus, Lactobacillus bulgaricus,* and *Lactobacillus casei.* After adding these cheese cultures, the resulting cheese formulation solution is stirred. This most preferred group of cheese cultures was found to provide good acid production and flavor development along with good texture improvement. This cheese culture group also enhances flavor development during ripening or maturing of the low fat cheese and also removes bitterness normally present in low fat Cheeses produced by different methods. This cheese culture will drop the pH to about 5.0 which assists in breaking down the cheese curd for the essential steps of melting and processing of the cheese and for achieving the final desired characteristic for the process cheese product.

In another form of the invention, only selected suitable ones of the bacteria cultures are used in preparing the starting low fat cheese for manufacturing the process cheese. The most preferred combination includes at least *Lactobacillus casei* and also at least one of *Streptococcus cremoris, lactis* or *thermophilus.* Alternately, one can also include *Lactobacillus helveticus* or *bulgaricus* in addition to *Lactobacillus casei.* In the case of mozzarella cheese one can choose to use only *Streptococcus thermophilus* and *Lactobacillus bulgaricus.* These various suitable cultures enable development of proper cheese texture, flavor and also remove or mask bitterness.

The cheese formulation solution is kept at temperatures from about 85°–95° F., and slow agitation was provided for about an hour. This processing time allows for solubilization of the carrageenans, enables a desirable reaction to take place between casein and the carrageenan; and slight acid development occurs in the cheese formulation solution (although the pH of the solution of about 6.5 does not change perceptibly). The next step is the addition of approximately 0.01 to 0.02% calcium chloride and rennet (or other conventional clotting enzyme substitute) in the amount of about 2–4 oz. per thousand pounds of milk and then agitation is ceased. The pH is still about 6.5. After about twenty to thirty minutes processing time and/or when the milk is substantially coagulated, the curd is cut in a conventional manner into small sections between about ¼ to ½ inch in both directions. This step increases the surface area of the curd, enhancing whey expulsion and improving heat distribution.

The curd is then left without stirring for about fifteen minutes, and the curd is stirred slowly with the temperature raised gradually to between about 100°–116° F. Stirring at this high temperature continued until a preferred, preselected pH range of the curd is reached, about 4.7–5.5 and preferably 4.9–5.1. This high temperature of about 100°–116° F. allows enhanced bacterial growth resulting in substantially improved cheese flavor and texture properties and also improved processing conditions for the process cheese. In a most preferred form of the invention, it is desirable to reduce pH below about 5.5 in order to dissolve the calcium associated with casein micelles and to enhance melting of skim milk cheese. The resulting cheese product generally tends to have good functionality and the appropriate characteristics necessary to achieve a good quality finished process cheese product.

Dry salt is added to the cheese curd product in the amount of about one to three percent of the curd weight, and then the product is hooped and pressed.

In another form of the invention dairy flavors can be added initially to the liquid milk, before or after pasteurization, but before further processing. The addition of such flavor additives at such an early stage in cheese manufacture leads to unexpected enhanced flavor development in the end product. These flavorants and their beneficial effects are the subject of the copending, incorporated patent application "Flavor Enhanced Low Fat Cheese".

As mentioned hereinbefore, various ratios of kappa to iota carrageenan can be used to produce a low fat cheese. Such additions can also be made before and/or after pasteurization. The carrageenan can thus act as a fat replacement, allowing the manufacturing process to proceed as if normal cheese were being produced (as characterized in terms of cutting, cooking and pressing). The carrageenan also restores moisture during pressing and controls the body firmness during ripening.

In another embodiment of the invention, the carrageenan can be left out altogether as long as a suitable bacterial culture is utilized. The carrageenan functions in part to control the texture of the low fat cheese prepared as a starting material for the preparation of process cheese. Therefore, since the texture of the starting material is not of primary importance in manufacturing process cheese, carrageenan can be used in the additional stages of manufacture of process cheese to produce the desired process cheese texture and moisture content. In addition, as described hereinbefore, the suitable bacterial culture need not include all six of the preferred species, but can include a lesser number of select cultures.

In addition to the previously described methods of manufacturing the basic starting material of low fat cheese, one can use the method described in incorporated U.S. Pat. No. 5,080,913, in which water washing of the curd controls the pH. However, in the preferred embodiment bacterial action in the liquid milk and production of lactic acid cause reduction of the pH to a value less than about 5.5, and preferably 5.0. If the pH is much more than 5.5, the melting point is increased and takes longer to melt. The resulting product is quite viscous or heavy which causes problems in pumping the process cheese product. Generally a higher pH results in retention of greater calcium, leading to the above cited problems. At the lower pH (less than about 5.5), the calcium in the casein can be more easily dissolved into the solution and then drained off during the steps of removing the whey. The resulting low fat cheese will exhibit improved melting and emulsifying properties during the steps of cooking the starting low fat cheese which is used in the manufacture of process cheese. This present method of removing the calcium does not therefore require the addition of phosphates or citrates which are normally used to up the calcium (but which addition would adversely affect enzymatic coagulation).

This method of producing low fat cheese at lower pH has the further advantage of providing substantially enhanced growth conditions for the bacterial cultures used to break down the casein and to establish desired cheese flavors. In this method, it is also unnecessary to use carrageenan since texture problems can be alleviated later by using carrageenan during the further steps of manufacturing the process cheese by using the starting low fat cheese material.

In the manufacture of the process cheeses, it is also not necessary to use any of the cheese flavorants when making the starting low fat cheese material. These flavorants can be selectively added as needed during the additional steps of manufacturing the process cheese product.

The starting low fat cheese product prepared in accordance with any of the previously disclosed methods is mixed with emulsifiers and stabilizers and then pumped into a conventional cheese cooker. The starting low fat cheese material is then cooked with direct steam injection until the skim milk cheese is melted. Preferred cheese flavor(s) and starter distillate are added, and the product is cooked to a maximum temperature of about 160° F. The process cheese product can then be packaged in forty pound blocks, and the cheese is placed in a cooler at 35° F. When the internal temperature of the cheese reaches about 35°–40° F., the cheese is ready for further processing, i.e., shredding and cutting.

In another form of this invention, the melted cheese mass can be pumped into an individually wrapped process cheese slice machine to make individually wrapped slices or naked slices or extruded into various shapes.

The following nonlimiting examples illustrate preparation of a range of different low fat process cheeses. The basic inventions can however be practiced by one of ordinary skill in the art to manufacture any selected type of common process cheese by using the appropriate knowledge for making typical fat containing cheeses but using the teachings herein of the components and methods set forth in the specification and Examples, as modified to achieve the selected cheese flavor and texture but without substantial fat content.

EXAMPLE 1

Six thousand pounds of fat free, cholesterol free, low calorie process cheese product, which has the flavor and texture of full fat American process cheese, was manufactured as follows: in a cheese blender the following were blended, 3,840 lbs. skim milk cheese, 24 lbs. kappa and 12 lbs. iota carrageenan, 6 lbs. guar gum, 6 lbs. xanthan gum, 141.6 lbs. sodium citrate, 12 lbs. sorbic acid, 2.4 lbs. of a conventional flavor enhancer, 318 lbs. whey solids, 1.8 lbs. annoto color and 1140 lbs. water. Ingredients were drawn into a 400 lbs. size direct steam injection cheese cooker in which the cheese was pasteurized at 160° F. Then, 8.0 lbs. of one of the previously described cheese flavors and 1.2 lbs. starter distillate were added, and the product was pumped into a holding tank and packaged in 40 lb. boxes and cooled to 40° F. The finished product contained approximately 57-58% moisture, about 1% salt, 5.5-5.9 pH, and less than about 1% fat and 0.6-1.0% carrageenan. The product exhibits good cutting, shredding and melting characteristics. In another form of this example the melted cheese was pumped from the holding tank into equipment adapted for making either hot or cold formed cheese singles.

EXAMPLE 2

Mozzarella process cheese product was manufactured according to Example 1 with the following modifications: no color was added and conventional mozzarella type cheese flavor was utilized.

EXAMPLE 3

Low sodium, fat free, cholesterol free and low calorie process cheese product was manufactured as in Example 1, but sodium citrate was replaced with potassium citrate.

EXAMPLES 4-7

Six thousand pounds of fat free, cholesterol free and low calorie process cheese product was manufactured as follows: 3840 lbs. skim milk cheese (prepared using the method of Example 1 of the copending incorporated patent application), 12 lbs. kappa carrageenan, 6 lbs. iota carrageenan, 60 lbs. sodium citrate, 60 lbs. disodium phosphate, 21 lbs. sodium aluminum phosphate and various gums described in Table 1. By varying the stabilizer type and/or percentage, fat free process cheese products of varying characteristics and properties are obtained. Table 1 summarizes the stabilizers used for Examples 4-7.

TABLE 1

| Example | Stabilizer |
| --- | --- |
| 4 | .2% Gelatin |
| 5 | .2% Microcrystaline Cellulose |
| 6 | .2% Carboxymethyl Cellulose |
| 7 | .1% of each of the above |

While the present invention has been described with reference to specific embodiments thereof, it will be understood that numerous modifications may be made by those skilled in the art without actually departing from the scope of the planned invention. Accordingly, modifications and equivalents can be contemplated to fall within the scope of the invention as claimed hereinafter.

I claim:

1. A method for the manufacture of a low fat cheese starting material for manufacturing process cheese, comprising the steps of:
   (a) preparing a starting liquid milk having a fat content of about 0-0.3%;
   (b) mixing carrageenan and a lactic acid producing culture with said starting liquid milk thereby forming a starting cheese formulation solution;
   (c) processing said cheese formulation solution by reacting clotting enzyme means with said cheese formulation solution and coagulating said solution thereby forming a curd in a whey solution;
   (d) cutting said curd thereby increasing surface are of said curd in said whey solution, achieving a pH of about 4.7-5.5 for said curd in said whey solution and dissolving Ca into said whey solution by a step consisting of maintaining the pH of said curd between about 4.7-5.5;
   (e) separating said whey solution from said curd, adding cold water to said curd to help in controlling pH of said curd, said whey solution including calcium dissolved in step (d); and then
   (f) ripening said curd to form said cheese starting material having a fat content arising from the fat content of said starting liquid milk.

2. The method as defined in claim 1 wherein said step (c) includes the addition of rennet or rennin to said cheese formulation solution.

3. The method as defined in claim 1 wherein said pH is about 5.0-5.5.

4. The method as defined in claim 1 wherein said lactic acid producing culture consists essentially of *Lactobacillus casei* and at least one bacterial culture selected from the group consisting of *Streptococcus cremoris, S. lactis, S., thermophilus, Lactobacillus helveticus* and *L. bulgaricus.*

5. The method as defined in claim 1 further including the step of adding cheese flavorants to said starting liquid milk.

6. A method of manufacturing a low fat process cheese product, comprising the steps of:
   (a) manufacturing a low fat natural cheese product having less than 3% fat by adding clotting enzyme means to a starting milk solution to form a curd in a whey solution, cutting said curd, achieving a pH of about 4.7-5.5 for said curd in said whey solution and dissolving Ca into said whey solution by a step consisting of maintaining the pH of said curd between about 4.7-5.5;
   (b) adding a carrageenan to said natural cheese product; and
   (c) cooking said natural cheese product and added carrageenan at a temperature sufficient to melt said natural cheese product thereby forming said low fat process cheese product.

7. The method as defined in claim 6 further including the step of adding cheese flavorants to said natural cheese product.

8. The method as defined in claim 7 further including pasteurizing said natural cheese product and adding said flavorants before said pasteurizing step.

9. The method as defined in claim 6 wherein said carrageenan is less than about 0.2% by weight of the liquid milk used to make said natural cheese product.

10. The method as defined in claim 9 further including the step of adding supplementary stabilizer materials to said natural cheese product.

11. The method as defined in claim 10 wherein said stabilizer materials are selected from the group consisting of gelatin, microcrystalline cellulose, carboxymethyl cellulose and mixtures thereof.

12. A method for the manufacture of a low fat natural cheese product suitable for process cheese manufacturing, comprising the steps of:
   (a) preparing a starting liquid milk having a fat content of about 0-0.3%;
   (b) adding carrageenan and a lactic acid producing cheese culture to said starting liquid mile thereby forming a starting cheese formulation solution;

(c) reacting said cheese formulation solution with clotting enzyme means and coagulating said solution thereby forming a curd in a whey solution;

(d) cutting and then cooking said curd at an elevated temperature less than 49° C. and at a pH of about 4.7-5.5 and dissolving Ca into said whey solution by a step consisting of maintaining the pH of said curd between about 4.7-5.5;

(e) separating said whey solution from said curd, adding cold water to said curd to help in controlling pH of said curd, said whey solution including calcium dissolved in step (d); and then (f) ripening said curd to form said low fat natural cheese product having a fat content arising from the fat content of said starting liquid milk.

13. The method as defined in claim 12 wherein said lactic acid producing cheese culture is selected from the group consisting of *Streptococcus lactis, Streptococcus cremoris, S. thermophilus, Lactobacillus helveticus, L. bulgaricus* and *L. casei.*

14. The method as defined in claim 12 wherein said lactic acid producing cheese culture consists of *Lactobacillus casei* and at least one bacteria culture selected from the group consisting of *Streptococcus cremoris, S. lactis, S. thermophilus, Lactobacillus helveticus,* and *L. bulgaricus.*

15. The method as defined in claim 12 wherein said step (c) includes adding rennet or rennin to said cheese formulation solution.

16. The method as defined in claim 12 wherein said carrageenan is less than about 0.2% by weight of said starting liquid milk.

17. The method as defined in claim 12 wherein said carrageenan comprises kappa and iota phases having a ratio of between about 3:1 to 1:5.

18. A method of manufacturing a real process cheese product, comprising the steps of:
(a) preparing a starting liquid milk having a fat content of about 0-0.3%;
(b) adding a lactic producing culture to said starting liquid milk thereby forming a starting cheese formulation solution;
(c) reacting said cheese formulation solution with clotting enzyme means to coagulate said solution thereby forming a curd in a whey solution;
(d) cutting said curd thereby increasing surface are of said curd in said whey solution, achieving a pH between about 4.7 and 5.5 for said curd in said whey solution and dissolving Ca into said whey solution by a step consisting of maintaining the pH of said curd between about 4.7-5.5;
(e) separating said whey solution from said curd, adding cold water to said curd to help in controlling pH of said curd, said whey solution including calcium dissolved in step (d);
(f) ripening said curd to form a natural cheese product having a fat content arising from the fat content of said starting liquid milk;
(g) adding a carrageenan to said natural cheese product; and then (h) cooking said natural cheese product at a temperature sufficient to melt said natural cheese product thereby forming said real process cheese product.

19. The method as defined in claim 18 wherein said process cheese product includes less than about 0.6-0.1% carrageenan.

20. The method as defined in claim 19 wherein said process cheese product is selected from the group consisting of process Cheddar cheese, process Colby cheese, process mozzarella cheese, process Jack cheese, process Gouda cheese, process American Cheese, process Muenster cheese, process Swiss cheese, process blue cheese, process Romano cheese, process Parmesan cheese and process Camembert cheese.

21. A method of manufacturing a low fat process cheese product, comprising the steps of:
(a) manufacturing a low fat natural cheese product having less than 3% fat by adding clotting enzyme means to a starting milk solution to form a curd in a whey solution, cutting said curd, achieving a pH range of about 4.7-5.5 for said curd in said whey solution and dissolving Ca into said whey solution by a step consisting of maintaining the pH of said curd between about 4.7-5.5;
(b) adding a stabilizer to said natural cheese product; and then
(c) cooking said natural cheese product and added stabilizer above a temperature sufficient to melt said natural cheese product thereby forming said low fat process cheese product.

22. The method as defined in claim 21 wherein said stabilizer is selected from the group consisting of carrageenan, gelatin, microcrystalline cellulose, carboxymethyl cellulose and mixtures thereof.

23. A method for the manufacture of a low fat cheese starting material for manufacturing process cheese, comprising the steps of:
(a) preparing a starting liquid milk having a fat content of about 0-0.3%;
(b) mixing a stabilizer and a lactic acid producing culture with said starting liquid milk thereby forming a starting cheese formulation solution;
(c) processing said cheese formulation solution by reacting clotting enzyme means with said cheese formulation solution and coagulating said solution thereby forming a curd in a whey solution;
(d) cutting said curd thereby increasing surface area of said curd in said whey solution, achieving a pH of about 4.7-5.5 for said curd in said whey solution and dissolving Ca into said whey solution by a step consisting of maintaining the pH of said curd between about 4.7-5.5;
(e) separating said whey solution from said curd, adding cold water to said curd to help in controlling pH of said curd, said whey solution including calcium dissolved in step (d); and then
(f) ripening said curd to form said cheese starting material having a fat content arising from the fat content of said starting liquid milk.

* * * * *